US011709856B2

(12) United States Patent
Tadepally et al.

(10) Patent No.: US 11,709,856 B2
(45) Date of Patent: *Jul. 25, 2023

(54) DATA MAPPER TOOL

(71) Applicant: Bank of America Corporation, Charlotte, NC (US)

(72) Inventors: Ravikanth Tadepally, Chennai (IN); Sudhansu Mohanty, Chennai (IN); Utkarsh Singhal, Gurugram (IN); Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 243 days.

This patent is subject to a terminal disclaimer.

(21) Appl. No.: 17/221,996

(22) Filed: Apr. 5, 2021

(65) Prior Publication Data

US 2021/0224289 A1     Jul. 22, 2021

Related U.S. Application Data

(63) Continuation of application No. 16/684,906, filed on Nov. 15, 2019, now Pat. No. 10,997,194.

(51) Int. Cl.
*G06F 16/00*     (2019.01)
*G06F 16/25*     (2019.01)
*G06F 16/21*     (2019.01)

(52) U.S. Cl.
CPC .......... *G06F 16/254* (2019.01); *G06F 16/212* (2019.01); *G06F 16/252* (2019.01)

(58) Field of Classification Search
CPC ..................................................... G06F 16/00
See application file for complete search history.

(56) References Cited

U.S. PATENT DOCUMENTS

| 5,966,717 | A | 10/1999 | Sass |
| 6,094,684 | A | 7/2000 | Pallmann |
| 6,665,677 | B1 | 12/2003 | Wotring et al. |
| 7,313,540 | B1 | 12/2007 | Hueler et al. |
| 7,379,934 | B1 | 5/2008 | Forman et al. |
| 7,546,286 | B2 | 6/2009 | Dickinson et al. |

(Continued)

OTHER PUBLICATIONS

Stahl et al., "Using Evolution Programs to Learn Local Similarity Measures," Citeseer ICCBR 2003, pp. 1-4. (Year: 2003).*

(Continued)

*Primary Examiner* — Cheryl Lewis

(57) ABSTRACT

An apparatus includes a processor. The processor extracts a column from an external source for import into a database configured to store a set of columns including a first and second column. The processor splits the entries of the import column into a set of terms. The processor generates a first, second, and third vector based on the frequency of each term of the set of terms in the first, second, and import columns, respectively. The processor determines a first similarity measure between the first and third vectors and a second similarity measure between the second and third vectors. The first similarity measure is greater than the second. In response, the processor provides an indication to a user that the first column is a mapping candidate for the import column, such that entries of the import column may be stored in the database as additional entries in the first column.

20 Claims, 5 Drawing Sheets

(56) References Cited

U.S. PATENT DOCUMENTS

| | | |
|---|---|---|
| 7,702,694 B1 | 4/2010 | Perkins et al. |
| 7,747,484 B2 | 6/2010 | Stanley et al. |
| 7,836,103 B2 | 11/2010 | Li et al. |
| 7,904,491 B2 | 3/2011 | Steinmann |
| 7,970,796 B1 | 6/2011 | Narayanan |
| 8,078,741 B2 | 12/2011 | Barnfield et al. |
| 8,274,506 B1 | 9/2012 | Rees |
| 8,364,665 B2 | 1/2013 | Su et al. |
| 8,443,036 B2 | 5/2013 | Li et al. |
| 8,554,805 B2 | 10/2013 | Roesner et al. |
| 8,583,701 B2 | 11/2013 | Werner et al. |
| 8,688,749 B1 | 4/2014 | Ducott, III et al. |
| 8,799,251 B2 | 8/2014 | McCormack et al. |
| 9,038,001 B2 | 5/2015 | Jetter et al. |
| 9,104,461 B2 | 8/2015 | Neary et al. |
| 9,141,913 B2 | 9/2015 | Kupershmidt et al. |
| 9,183,349 B2 | 11/2015 | Kupershmidt et al. |
| 9,195,696 B2 | 11/2015 | Smith |
| 9,330,120 B2 | 5/2016 | Downing et al. |
| 9,430,505 B2 | 8/2016 | Padmanabhan et al. |
| 9,443,033 B2 | 9/2016 | Lambert et al. |
| 9,514,244 B2 | 12/2016 | Hazlewood et al. |
| 9,529,933 B2 | 12/2016 | Hazlewood et al. |
| 9,619,538 B2 | 4/2017 | Ryan et al. |
| 9,753,817 B2 | 9/2017 | Jain et al. |
| 9,836,713 B2 | 12/2017 | Bagchi et al. |
| 9,898,497 B2 | 2/2018 | Ruiz Velazquez et al. |
| 10,275,711 B2 | 4/2019 | Kupershmidt et al. |
| 2002/0022929 A1 | 2/2002 | Ell |
| 2002/0035431 A1 | 3/2002 | Ell |
| 2003/0208319 A1 | 11/2003 | Ell et al. |
| 2004/0133598 A1 | 7/2004 | Dobrowski et al. |
| 2004/0172592 A1 | 9/2004 | Collie et al. |
| 2005/0283374 A1 | 12/2005 | Salomon et al. |
| 2006/0161581 A1 | 7/2006 | George et al. |
| 2009/0157801 A1 | 6/2009 | Barber et al. |
| 2012/0304248 A1 | 11/2012 | Watts et al. |
| 2018/0113890 A1 | 4/2018 | Raza et al. |

OTHER PUBLICATIONS

Huang, "Similarity Measures for Text Document Clustering," NZCRSC 2008, April, Citeseer, pp. 1-8. (Year: 2008).*

Tadepally, R., et al., "Data Mapper Tool," U.S. Appl. No. 16/684,906, filed Nov. 15, 2019, 35 pages.

Willhalm, T. et al., "Vectorizing Database Column Scans with Complex Predicates", ADMS@VLDB, 2013—adms—conf.org., Year 2013, pp. 1-12.

* cited by examiner

DATA MAPPER TOOL

CROSS-REFERENCE TO RELATED APPLICATIONS

This application is a continuation of U.S. patent application Ser. No. 16/684,906 filed Nov. 15, 2019, by Ravikanth Tadepally et al., and entitled "DATA MAPPER TOOL," which is incorporated herein by reference.

TECHNICAL FIELD

This invention relates generally to data storage and use, and specifically to a tool for mapping data into a system.

BACKGROUND

Data storage systems may store data in a variety of different formats and/or structures. Accordingly, to import data from external sources, organizations typically create mappings between the data to be imported and the data stored in their internal systems.

SUMMARY

Data storage systems may store data in a variety of different formats and/or structures. For example, data may be stored in structured databases, semi-structured databases, unstructured databases, html files, and ASCII files, among others. Additionally, different organizations may store the same types of data under different labels/headings. For example, a first organization may store a list of businesses as a column of data, under the heading "Businesses," a second organization may store a similar list of names under the heading "Organizations," and a third organization may store a similar list under the heading "data_org." Accordingly, to import data from external sources, organizations typically create mappings between the data to be imported and the data stored in their internal systems. As an example, the first organization of the above example may create a mapping to indicate that external data stored in columns under headings including "Organizations," and "data_org," may correspond to data stored by the first organization under the heading "Businesses." While manually generating such mappings may be a straightforward process for small data sets, it is a highly inefficient and error prone process for large data sets. For example, an organization may spend days or even weeks generating a set of mappings between external data and the data stored in its system, before being able to import and use the data.

This disclosure contemplates a data mapper tool that addresses one or more of the above technical problems. In response to receiving a request to import a set of data into an internal database, the tool automatically identifies a set of columns stored in the internal database that may serve as mapping candidates for the data to be imported. The tool identifies these columns by comparing entries in the data to be imported with entries stored in the internal database, to identify those columns stored in the internal database that contain entries which are most similar to the entries of the data to be imported. In certain embodiments, after identifying the mapping candidates for the data to be imported, the tool may then import the data and store it in the internal database. Certain embodiments of the tool are described below.

According to one embodiment, an apparatus includes a hardware processor. The processor extracts a column for import from an external source. The column for import includes one or more entries and is to be stored in a database configured to store a set of columns. The set of columns includes a first column and a second column. The first column includes one or more entries and the second column includes one or more entries. The processor also splits the entries of the column for import into a set of terms. The processor additionally generates a first vector, a second vector, and a third vector, based on the set of terms. For each term in the set of terms, generating the first vector includes determining a first frequency of the term in the entries of the first column and generating a component of the first vector, based on the first frequency. For each term in the set of terms, generating the second vector includes determining a second frequency of the term in the entries of the second column and generating a component of the second vector, based on the second frequency. For each term of the set of terms, generating the third vector includes determining a third frequency of the term in the entries of the column for import and generating a component of the third vector, based on the third frequency. The processor further determines a first similarity measure, based on a dot product between the first vector and the third vector. The processor also determines a second similarity measure, based on a dot product between the second vector and the third vector. The processor additionally determines that the first similarity measure is greater than the second similarity measure. In response to determining that the first similarity measure is greater than the second similarity measure, the processor provides an indication to a user that the first column is a mapping candidate for the column for import, such that the entries of the column for import may be stored in the database as additional entries in the first column.

According to another embodiment, a method includes extracting a column for import from an external source. The column for import includes one or more entries and is to be stored in a database. The database stores a set of columns. The set of columns includes a first column and a second column. The first column includes one or more entries and the second column includes one or more entries. The method also includes splitting the entries of the column for import into a set of terms. The method additionally includes generating a first vector, a second vector, and a third vector, based on the set of terms. For each term in the set of terms, generating the first vector includes determining a first frequency of the term in the entries of the first column and generating a component of the first vector, based on the first frequency. For each term in the set of terms, generating the second vector includes determining a second frequency of the term in the entries of the second column and generating a component of the second vector, based on the second frequency. For each term in the set of terms, generating the third vector includes determining a third frequency of the term in the entries of the column for import and generating a component of the third vector, based on the third frequency. The method further includes determining a first similarity measure, based on a dot product between the first vector and the third vector. The method also includes determining a second similarity measure, based on a dot product between the second vector and the third vector. The method additionally includes determining that the first similarity measure is greater than the second similarity measure. In response to determining that the first similarity measure is greater than the second similarity measure, the method includes providing an indication to a user that the first column is a mapping candidate for the column for import, such that the entries of the column for import may be stored in the database as additional entries in the first column.

According to a further embodiment, a system includes a storage element and a processing element. The storage element is operable to store a set of columns. The set of columns includes a first column and a second column. The first column includes one or more entries and the second column includes one or more entries. The processing element is operable to extract a third column from an external source. The third column is to be stored in the storage element and includes one or more entries. The external source includes at least one of a structured database, an unstructured database, and a text document. The processing element is also operable to split the entries of the third column into a set of terms. The processing element is additionally operable to generate a first vector, a second vector, and a third vector, based on the set of terms. For each term in the set of terms, generating the first vector includes determining a first frequency of the term in the entries of the first column and generating a component of the first vector, based on the first frequency. For each term in the set of terms, generating the second vector includes determining a second frequency of the term in the entries of the second column and generating a component of the second vector, based on the second frequency. For each term in the set of terms, generating the third vector includes determining a third frequency of the term in the entries of the third column and generating a component of the third vector, based on the third frequency. The processing element is further operable to determine a first similarity measure, based on a dot product between the first vector and the third vector. The processing element is also operable to determine a second similarity measure, based on a dot product between the second vector and the third vector. The processing element is additionally operable to determine that the first similarity measure is greater than the second similarity measure. In response to determining that the first similarity measure is greater than the second similarity measure, the processing element is operable to provide an indication to a user that the first column is a mapping candidate for the third column, such that the entries of the third column may be stored in the database as additional entries in the first column.

Certain embodiments provide one or more technical advantages. For example, an embodiment increases the efficiency of the data import process, by automatically generating mappings between data to be imported and data already stored in an internal system. As another example, an embodiment reduces the number of errors generated in the data mapping process, as compared to a manual data mapping process, by identifying mapping candidates based on the similarity between the data to be imported and the data stored in the internal system. The system described in the present disclosure may particularly be integrated into a practical application of a data import system for an organization, which may be used to automatically identify mappings between the data to be imported and the data stored in an internal database belonging to the organization and to subsequently import the data into the internal database.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
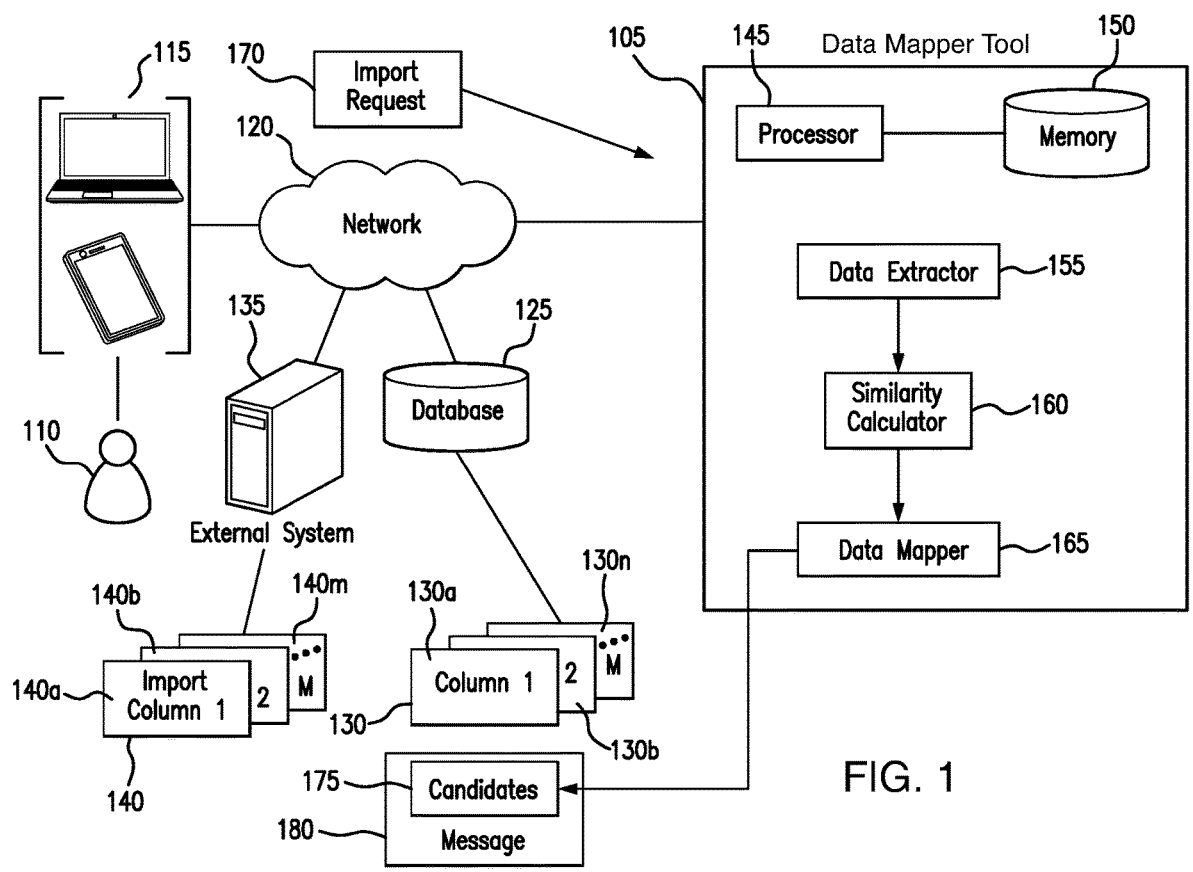
FIG. 1 illustrates an example data mapper tool system.
Figure 2A:
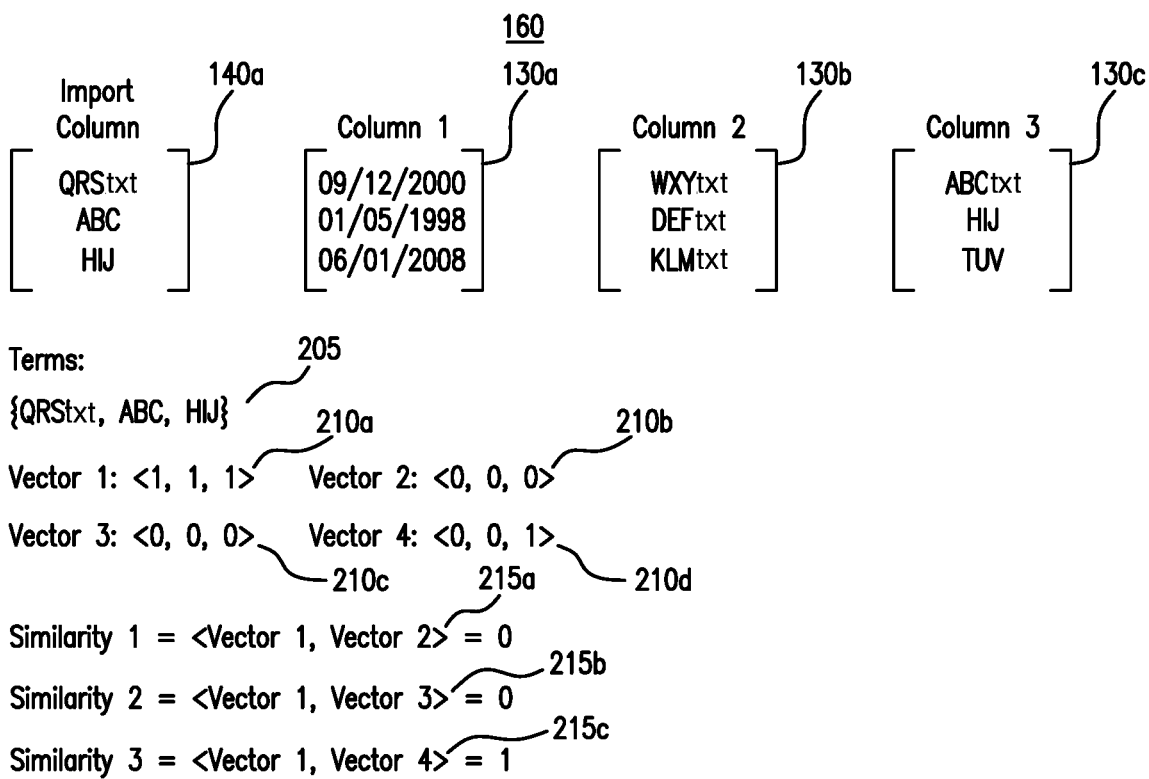
FIGS. 2A through 2C present example similarity calculations performed by the similarity calculator of the data mapper tool of the system of FIG. 1.
Figure 2B:
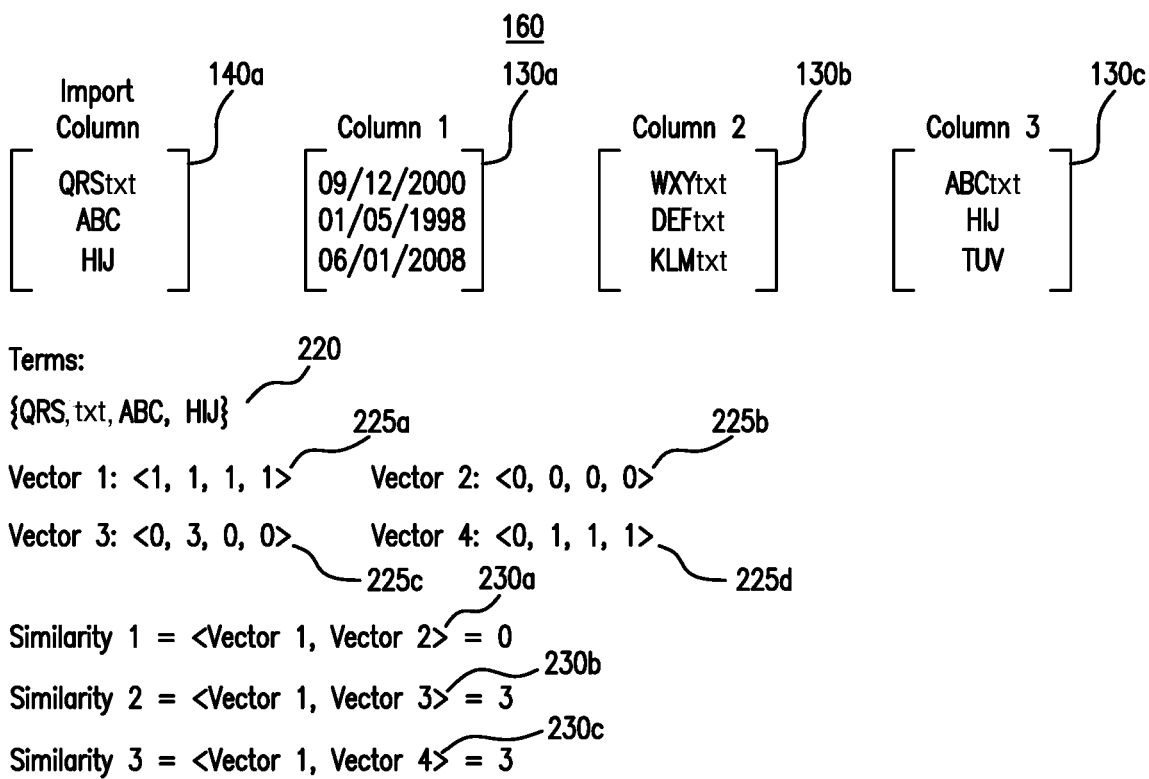
Figure 2C:
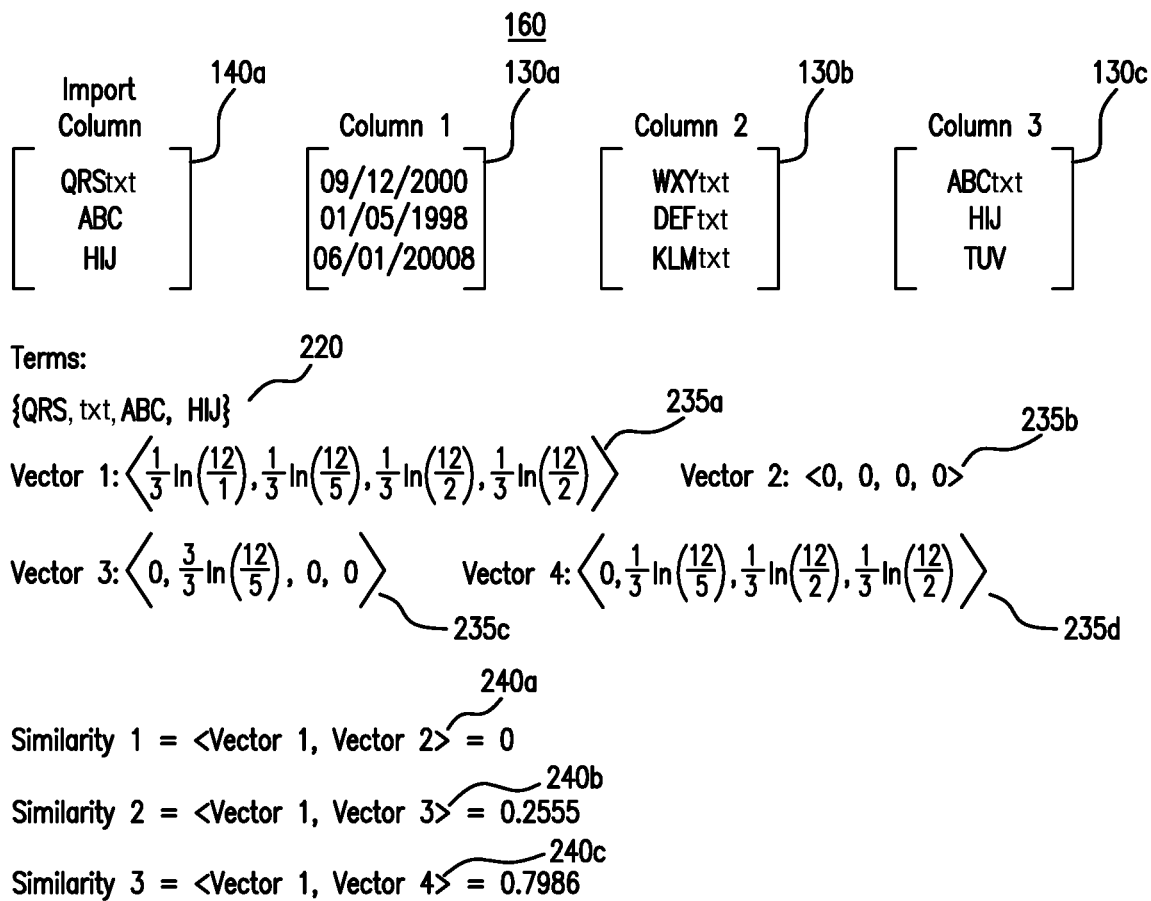
Figure 3:
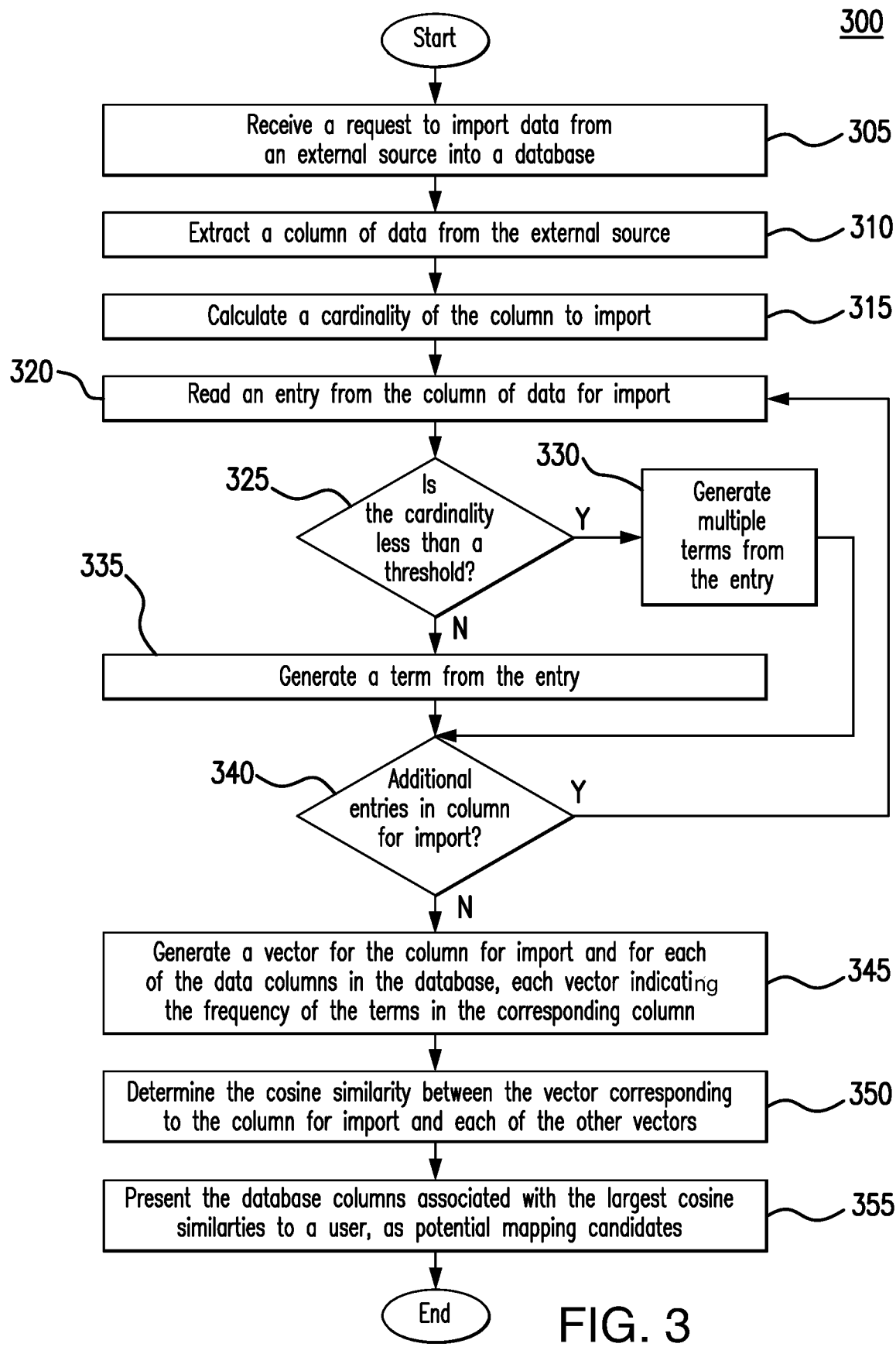
FIG. 3 presents a flowchart illustrating the process by which the data mapper tool of the system of FIG. 1 identifies columns of data stored in an internal database as mapping candidates to which a column of data to be imported into the internal database may map.

Embodiments of the present disclosure and its advantages may be understood by referring to FIGS. 1 through 3 of the drawings, like numerals being used for like and corresponding parts of the various drawings.

I. System Overview

FIG. 1 illustrates an example system 100 that includes data mapper tool 105, users 110, devices 115, network 120, database 125, and external system 135. Generally, data mapper tool 105 receives import requests 170 from devices 115, identifying columns of data (import columns) 140 stored in external system 135, to be imported into database 125. In response, data mapper tool 105 extracts an import column 140 from external system 135 and compares the import column 140 to columns of data 130 stored in database 125. Data mapper tool 105 determines those columns of data 130 most similar to import column 140 and presents those columns to user 110 as mapping candidates 175. The manner by which data mapper tool 105 determines those columns of data 130 most similar to import column 140 is described in further detail below, in the discussion of FIGS. 2A through 2C.

Devices 115 may be used by users 110 to send import requests 170 to data mapper tool 105. An import request 170 may identify one or more columns of data (import columns) 140, stored in external system 135, which user 110 is seeking to import into database 125. An import request 170 may identify import columns 140 in any suitable manner. For example, import request 170 may identify a name of a file storing the import columns 140, a database storing the import columns 140, a location in a database storing the import columns 140, or any other suitable location used to store import columns 140. In certain embodiments, devices 115 may also be used by users 110 to receive messages 180. A message 180 may identify those columns 130 stored in database 125 that are potential mapping candidates 175 for an import column 140 (i.e., those columns 130 most similar to import column 140).

Devices 115 include any appropriate device for communicating with components of system 100 over network 120. For example, devices 115 may be a telephone, a mobile phone, a computer, a laptop, a wireless or cellular telephone, a tablet, a server, and IoT device, and/or an automated assistant, among others. This disclosure contemplates devices 115 being any appropriate device for sending and receiving communications over network 120. Device 115 may also include a user interface, such as a display, a microphone, keypad, or other appropriate terminal equipment usable by user 110. In some embodiments, an application executed by a processor of device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 125 stores columns of data 130a through 130n. Each column of data 130a through 130n may store data in any suitable format. For example, columns of data 130 may store data as text, integers, floating point numbers, fractions, combinations of alpha-numeric characters, and/or any other suitable format. Additionally, each column of data 130a through 130n may store any number of data entries. For example, first column of data 130a may store one hundred entries, while second column of data 130b stores one thousand entries.

External system 135 represents any computational component from which data mapper tool 105 may import data. For example, external system 135 may represent processors, storage elements (including structured, unstructured, and semi-structured databases), application servers, database servers, file servers, mail servers, print servers, web servers, or any other type of computation resource from which data mapper tool 105 may import data. While illustrated in FIG. 1 as external system 135 storing data in the form of import columns 140, this disclosure contemplates that external system 135 may store data in any suitable format. For example, external system 135 may store data in the form of a string of text in an ASCII file.

As seen in FIG. 1, data mapper tool 105 includes a processor 145 and a memory 150. This disclosure contemplates processor 145 and memory 150 being configured to perform any of the functions of data mapper tool 105 described herein. Generally, data mapper tool 105 implements data extractor 155, similarity calculator 160, and data mapper 165.

Data extractor 155 extracts one or more columns of data 140 from external system 135, in response to receiving import request 170, identifying columns 140 to be imported from external system 135. Data extractor 155 may be a software module stored in memory 150 and executed by processor 145. An example of the operation of data extractor 155 is as follows: (1) identify an import column 140 from import request 170; (2) for each entry of import column 140, read the entry into memory 150.

Similarity calculator 160 calculates similarity measures between import column 140 and each of a subset of columns 130 stored in database 125. A similarity measure between import column 140 and a column 130a indicates how similar the entries of import column 140 are to the entries of column 130a. The manner by which similarity calculator 160 calculates the similarity measures will be described in further detail below, in the discussion of FIGS. 2A through 2C.

Data mapper 165 identifies a predefined number of columns 130 as potential mapping candidates 175 for import column 140. For example, data mapper 165 may identify a single column 130 as a mapping candidate 175 for import column 140, three columns 130 as mapping candidates 175 for import column 140, or any other number of columns 130 as mapping candidates 175 for import column 140. This disclosure contemplates that the mapping candidates 175 identified by data mapper 165 are those columns 130 for which the similarity measures calculated between the column 130 and import column 140 are the largest.

In certain embodiments, in response to identifying one or more columns 130 as mapping candidates 175 for import column 140, data mapper 165 may send message 180 to user 110. Message 180 may provide user 110 with an indication of the one or more columns 130 identified as mapping candidates 175 for import column 140. In some embodiments, in response to identifying one or more columns 130 as mapping candidates for import column 140, data mapper 165 may save an identification of the columns in a mapping file. The mapping file may include mapping candidates for any number of import columns 140. Data mapper 165 may then send the mapping file to user 110 as candidate message 175.

In certain embodiments, in addition to identifying mapping candidates 175, data mapper 165 may import the data stored in import column 140 into database 125. For example, data mapper 165 may add the entries of import column 140 to the mapping candidate 175 associated with the largest similarity measure.

Data mapper 165 may be a software module stored in memory 150 and executed by processor 145. An example of the operation of data mapper 165 is as follows: (1) identify mapping candidates 175 based on the similarity between import column 140 and columns 130 stored in database 125, as determined by similarity calculator 160; (2) generate message 180, containing an indication of mapping candidates 175; and (3) send message 180 to user 110.

Processor 145 is any electronic circuitry, including, but not limited to microprocessors, application specific integrated circuits (ASIC), application specific instruction set processor (ASIP), and/or state machines, that communicatively couples to memory 150 and controls the operation of data mapper tool 105. Processor 145 may be 8-bit, 16-bit, 32-bit, 64-bit or of any other suitable architecture. Processor 145 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 145 may include other hardware and software that operates to control and process information. Processor 145 executes software stored on memory to perform any of the functions described herein. Processor 145 controls the operation and administration of data mapper tool 105 by processing information received from network 120, device(s) 115, and memory 150. Processor 145 may be a programmable logic device, a microcontroller, a microprocessor, any suitable processing device, or any suitable combination of the preceding. Processor 145 is not limited to a single processing device and may encompass multiple processing devices.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

Modifications, additions, or omissions may be made to the systems described herein without departing from the scope of the invention. For example, system 100 may include any number of users 110, devices 115, networks 120, databases 125, and external systems 135. The components may be integrated or separated. Moreover, the operations may be performed by more, fewer, or other components. Additionally, the operations may be performed using any suitable logic comprising software, hardware, and/or other logic.

II. Similarity Calculation

FIGS. 2A through 2C present examples of the operation of similarity calculator 160. The examples illustrated in FIGS. 2A through 2C consider an import column 140a that includes three entries—"QRStxt," "ABC," and "HIJ." These examples contemplate that import column 140a is to be imported into a database 125 that includes three columns—first column 130a, second column 130b, and third column 130c. First column 130a includes three entries—"09/12/2000," "01/05/1998," "06/01/2008"—second column 130b includes three entries—"WXYtxt," "DEFtxt," and "KLMtxt"—and third column 130c includes three entries—"ABCtxt," "HIJ," and "TUV." While illustrated in FIGS. 2A through 2C as including three columns 130a through 130c, this disclosure contemplates that database 125 may include any number of columns 130. Additionally, while illustrated in FIGS. 2A through 2C as columns 130a through 130c each including three entries, this disclosure contemplates that columns 130 may each include any number of entries.

Similarity calculator 160 is configured to compare import column 140a to columns 130 stored in database 125, by calculating a similarity measure 215 between import column 140a and each of columns 130. Similarity measure 215 provides a measure of the degree of similarity between import column 140a and a given column 130. The larger the similarity measure 215, the more similar the entries of import column 140a are to the entries of the given column 130. In certain embodiments, and as illustrated in FIGS. 2A through 2C, similarity calculator 160 is configured to determine similarity measures 215 between import column 140a and each and every column of the columns 130 stored in database 125. On the other hand, in some embodiments, similarity calculator 160 is configured to determine similarity measures 215 between import column 140a and each column of a subset of columns 130 stored in database 125. As an example, similarity calculator 160 may determine similarity measures 215 between import column 140a and those columns 130 that include entries of the same format as the entries of import column 140a. For example, in the example illustrated in FIGS. 2A through 2C, similarity calculator 160 may determine that import column 140a includes entries comprised of letters. Accordingly, similarity calculator 160 may determine similarity measures 215 between import column 140a and columns 130b and 130c, but not between import column 140a and column 130a, since columns 130b and 130c also include entries comprised of letters, while column 130a includes entries comprised of numbers rather than letters.

Similarity calculator 160 may determine similarity measures 215 between import column 140a and columns 130 stored in database 125 in several different manners. Each of FIGS. 2A through 2C presents a different example of a manner by which similarity calculator 160 may determine similarity measures 215 between import column 140a and columns 130.

In order to determine similarity measures between import column 140a and columns 130, similarity calculator 160 first splits the entries of import column 140a into a set of terms 205. As illustrated in FIG. 2A, in certain embodiments, similarity calculator 160 splits each entry of import column 140a into a single term. For example, similarity calculator 160 splits the entries of import column 140a into a set 205 of three terms—"QRStxt," "ABC," and "HIJ."

After splitting import column 140a into a set of terms 205, similarity calculator 160 next uses set of terms 205 to form a set of vectors 210. The set of vectors 210 includes a first vector 210a assigned to import column 140a, a second vector 210b assigned to first column 130a, a third vector 210c assigned to second column 130b, and a fourth vector 210d assigned to third column 130c. Each component of each vector 210 is assigned to a term of the set of terms 205. For example, as illustrated in FIG. 2A, set of terms 205 includes three terms-"QRStxt," "ABC," and "HIJ." Accordingly, each of vectors 210a through 210d includes three components—a first component assigned to term "QRStxt," a second component assigned to term "ABC," and a third component assigned to term "HIJ." Each component of each vector 210 provides an indication of the frequency of the associated term in the column 140a, 130a, 130b, or 130c to which the vector 210 is assigned. This disclosure contemplates that the indication of the frequency of the term may be provided in any suitable manner. As an example, in certain embodiments, and as illustrated in FIG. 2A, the indication of the frequency of the term may be a raw count of the number of times the term appears in the corresponding column. For example, first vector 210a, assigned to import column 140a, consists of components (1,1,1), to indicate that each of first term "QRStxt," second term "ABC," and third term "HIJ" appears once in import column 140a. Similarly, second vector 210b, assigned to first column 130a, and third vector 210c, assigned to second column 130b, both consist of components (0,0,0), to indicate that none of first term "QRStxt," second term "ABC," and third term "HIJ" appears in first column 130a and second column 130b. Finally, fourth vector 210d, assigned to third column 130c, consists of components (0,0,1), to indicate that third term "HIJ" appears once in third column 130c.

Similarity calculator 160 next uses vectors 210a through 210d to calculate similarity measures 215 between import column 140a and each of columns 130a through 130c stored in database 125. Similarity measures 215 are based on the dot products between vector 210a, associated with import column 140a, and each of vectors 210b through 210d, associated with columns 130a through 130c, stored in database 125. For example, first similarity measure 215a is based on the dot product between first vector 210a and second vector 210b, and provides a measure of the degree of similarity between the entries in import column 140a and the entries in first column 130a. Second similarity measure 215b is based on the dot product between first vector 210a and third vector 210c, and provides a measure of the degree of similarity between the entries in import column 140a and the entries in second column 130b. Finally, third similarity measure 215c is based on the dot product between first vector 210a and fourth vector 210d, and provides a measure of the degree of similarity between the entries in import column 140a and the entries in third column 130c. While illustrated in FIG. 2A as equal to the dot products between first vector 210a and each of vectors 210b through 210c, respectively, in certain embodiments, the similarity measures 215 are further normalized by the lengths of the vectors used to determine the dot products.

As can be seen from similarity measures 215a through 215c, in the example of FIG. 2A, similarity calculator 160 has determined that import column 140a is similar to third column 130c and not at all similar to first column 130a or second column 130b. This makes sense given that import column 140a and third column 130c share an entry, "HIJ," while import column 140a doesn't share any entries with either first column 130a or second column 130b. However, even though import column 140a does not share any entries with second column 130b, it nevertheless appears that both import column 140a and second column 130b include entries that correspond to the names of text files (e.g., entries which include the term "txt"). Accordingly, it may be desirable for similarity calculator 160 to determine that second column 130b is more similar to import column 140a than first column 130a, given that first column 130a simply includes a set of dates. FIG. 2B presents an example similarity calculation designed to capture this similarity between import column 140a and second column 130b.

As illustrated in FIG. 2B, in certain embodiments, rather than splitting each entry of import column 140a into a single term, similarity calculator 160 splits each entry of import column 140a into one or more terms, where each term is of a given length of characters. As an example, similarity calculator 160 may split each entry of import column 140a into terms of three characters in length. For example, similarity calculator 160 may split import column 140a into a set 220 of four terms—"QRS," "txt," "ABC," and "HIJ"—where each term is of three characters in length. The given length of characters of the terms may be specified by a user 110 or a system administrator.

In certain embodiments, similarity calculator 160 may determine whether to split an entry of import column 140a into either a single term or multiple terms based on the fraction of distinct terms in import column 140a. For example, if similarity calculator 160 determines that the fraction of distinct entries in import column 140a is less than a predefined fraction, similarity calculator 160 may split each entry of import column 140a into a single term. This may occur when the entries of import column 140a may take one of only a few possible values. For example, if import column 140a includes two distinct values and ten total entries, and the predefined fraction is 0.4, similarity calculator 160 may split each entry of import column 140a into a single term rather than multiple terms. This may be desirable to help ensure that similarity calculator 160 identifies mapping candidates 175 that include the same entries as import column 140, rather than simply entries that include substrings of the entries of import column 140. As an example, an import column 140 may include entries that may take one of two possible values—"yes," or "no." In such situations, to determine columns 130 that are similar to import column 140, it may be desirable to compare the full entries, "yes" and "no," to the full entries of columns 130 stored in database 125, since any potential mapping candidates 175 should also include entries that include the full values "yes" and "no," rather than just entries that include substrings of "yes" and "no," such as "y," "e," "s," "ye," "es," "n," or "o."

On the other hand, if similarity calculator 160 determines that the fraction of distinct terms in import column 140a is greater than the given fraction, similarity calculator 160 may split each entry of import column 140a into one or more terms, where each term is of a given length of characters. This may occur when the entries of import column 140a may take many possible values. For example, if import column 140a includes three distinct values and three total entries, as illustrated in FIGS. 2A through 2C, and the predefined fraction is 0.4, similarity calculator 160 may split each entry of import column 140a into one or more terms. This may be desirable in situations in which multiple distinct strings may be used to represent the same value for a given entry of import column 140. For example, as illustrated in FIGS. 2A through 2C, import column 140a includes the entry "QRStxt." This entry may correspond to a text file named "QRS." Accordingly, a variety of different strings may be used to represent the text file, including "QRStxt," "QRS," "QRS.txt," or any other appropriate string. Therefore, to identify mapping candidates 175 that include entries that represent text file QRS, but identify text file QRS using strings other than "QRStxt," it may be desirable to split the entry "QRStxt" into multiple terms. For example, it may be desirable to split the entry "QRStxt" into two terms—"QRS" and "txt"—as illustrated in FIGS. 2B and 2C. Splitting the entry "QRStxt" into the terms "QRS" and "txt" may also be desirable to identify mapping candidates 175 that include entries that identify other text files (e.g., entries that include the term "txt").

After splitting import column 140a into set of terms 220, similarity calculator 160 next uses set of terms 220 to form a set of vectors 225, in a similar manner as described above, in the discussion of FIG. 2A. Here, the set of vectors 225 includes a first vector 225a assigned to import column 140a, a second vector 225b assigned to first column 130a, a third vector 225c assigned to second column 130b, and a fourth vector 225d assigned to third column 130c. Each of vectors 225a through 225d includes four components—a first component assigned to term "QRS," a second component assigned to term "txt," a third component assigned to term "ABC," and a fourth component assigned to term "HIJ." Each component of each vector 210 provides an indication of the frequency of the associated term in the column 140a, 130a, 130b, or 130c to which the vector 225 is assigned. As with the example presented in FIG. 2A, the example presented in FIG. 2B uses a raw count of the number of times a term appears in the corresponding column as the indication of the frequency of the term. For example, first vector 225a consists of components (1,1,1,1), to indicate that each of first term "QRS," second term "txt," third term "ABC," and fourth term "HIJ" appears once in import column 140a. Similarly, second vector 225b consists of components (0,0, 0,0), to indicate that none of first term "QRS," second term "txt," third term "ABC," and fourth term "HIJ" appears in first column 130a, while third vector 225c consists of components (0,3,0,0) to indicate that three instances of second term "txt" appear in second column 130b. Finally, fourth vector 225d consists of components (0,1,1,1), to indicate that all terms except first term "QRS" appear once in third vector 130c.

Similarity calculator 160 next computes the dot products between import column 140a and each of columns 130a through 130c to determine similarity measures 230a through 230c. As illustrated in FIG. 2B, by splitting first entry, "QRStxt," of import column 140a into two terms, "QRS," and "txt," second similarity measure 230b now captures a similarity between import column 140a and second column 130b, given that both columns include entries that include the term "txt." Indeed, similarity calculator 160 has determined that both second column 130b and third column 130c are equally similar to import column 130a (i.e., second similarity measure 230*b* and third similarity measure 230*c* are equal). However, in contrast to second column 130*b*, which merely includes entries that include the term "txt," third column 130*c* includes entries that include the same file names as import column 140*a*—"ABC," and "HIJ." Accordingly, it may be desirable for similarity calculator 160 to determine that second column 130*b* is less similar to import column 140*a* than third column 130*c*. FIG. 2C presents an example similarity calculation designed to capture this desired similarity difference between second similarity measure 230*b* and third similarity measure 230*c*.

As illustrated in FIG. 2C, rather than using a raw count to indicate the frequency of each term of the set of terms 230 in columns 140*a* and 130*a* through 130*c*, in certain embodiments, similarity calculator 160 uses a weighted frequency. This disclosure contemplates that similarity calculator 160 may use any appropriate weighted frequency. For example, for a given column 130 consisting of N total entries, similarity calculator 160 may use, for a given term, a weighted frequency of the form:

$$wf = \frac{f}{N} \quad (1)$$

where f indicates the number of times the term appears in column 130. As another example, similarity calculator 160 may use a logarithmically weighted frequency of the form:

$$wf = \log(1+f). \quad (2)$$

As a further example, similarity calculator 160 may use a weighted frequency, weighted by the frequency of the most commonly occurring term in the column 130. For example:

$$wf = \frac{f}{\max f} \quad (3)$$

where maxf is the frequency of the most commonly occurring term in column 130. In certain embodiments, similarity calculator 160 may use a weighted frequency as specified by the term frequency, inverse document frequency (TF-IDF) method. For example, similarity calculator 160 may use a weighted frequency of the form:

$$wf = \frac{f}{N} \log\left(\frac{M}{f_M}\right) \quad (4)$$

where M is the total number of entries in all of the columns considered (e.g., the total number of entries in columns 140*a*, 130*a*, 130*b*, and 130*c* combined), and $f_M$ indicates the number of entries of the total number of entries, M, that include the given term. In addition to the weighted frequencies given by equations (1) through (4), this disclosure contemplates that similarity calculator 160 may use any suitable weighted frequency. In particular, similarity calculator 160 may use any form of weighted frequency specified by the TF-IDF method.

In the example illustrated in FIG. 2C, similarity calculator uses a TF-IDF frequency of the form given by equation (4). This type of weighted frequency is designed to assign a lower weight to terms that commonly occur within the columns 130 and 140 under consideration, and that may therefore be less indicative of the similarity between columns than less commonly occurring terms. For example, if columns 130 and 140 included sentences, the TF-IDF frequency of equation (4) would assign a lower weight to words such as "the" and "and," that occur frequently within most sentences.

As illustrated in FIG. 2C, using the TF-IDF frequency given by equation (4) results in similarity calculator 160 assigning lower weights to the term "txt," than the remaining terms "QRS," "ABC," and "HIJ," in vectors 235. This occurs because "txt" is the most commonly occurring term of the terms in set of terms 220. Accordingly, by assigning a lower weight to this commonly occurring term, similarity calculator 160 now determines that, while nevertheless somewhat similar to second column 130*b*, import column 140*a* is most similar to third column 130*c*, as indicated by similarity measures 240*a* through 240*c*.

Similarity calculator 160 may be a software module stored in memory 150 and executed by processor 145. An example of the operation of similarity calculator 160 is as follows: (1) split each entry of import column 140*a* into one or more terms to form set of terms 205; (2) form a set of vectors 210*a* through 210*d*, by determining the frequency of each term of set of terms 205 in each of import column 140*a*, first column 130*a*, second column 130*b*, and third column 130*c*, respectively; (3) determine similarity measures 215 between import column 140*a* and each of columns 130*a* through 130*c*, based on the dot product between first vector 210*a*, assigned to import column 140*a*, and vectors 210*b* through 210*d*, assigned to first column 130*a*, second column 130*b*, and third column 130*c*, respectively.

III. Method to Determine Mapping Candidates

FIG. 3 presents a flowchart illustrating the process by which data mapper tool 105 identifies columns of data 130, stored in database 125, as mapping candidates 175 to which import column 140*a* may map. In step 305, data mapper tool 105 receives a request 170 to import data from an external source 135 into database 125. In step 310, data mapper tool 105 extracts a column of data (import column) 140 from external source 135. In step 315, data mapper tool 105 calculates a cardinality of import column 140. The cardinality of import column 140 is determined as the number of distinct entries of import column 140 divided by the total number of entries of import column 140. In step 320, data mapper tool 105 reads an entry from import column 140. In step 325, data mapper tool 105 determines whether the cardinality, calculated in step 315, is less than a predefined threshold. If, in step 325, data mapper tool 105 determines that the cardinality is less than the predefined threshold, then in step 330, data mapper tool 105 generates one or more terms from the entry. For example, data mapper tool 105 may split the entry into multiple terms, where each term is of a given number of characters in length. On the other hand, if, in step 325, data mapper tool 105 determines that the cardinality is greater than the predefined threshold, then in step 335, data mapper tool 105 generates a single term from the entry. In step 340, data mapper tool 105 determines whether import column 140 includes additional entries. If, in step 340, data mapper tool 105 determines that import column 140 includes additional entries, data mapper tool 105 returns to step 320. On the other hand, if, in step 340, data mapper tool 105 determines that import column 140 does not include additional entries, data mapper tool 105 proceeds to step 345.

In step 345, data mapper tool 105 generates a vector 210*a* associated with import column 140. Data mapper tool 105 also generates vectors 210*b* through 210*d*, each associated with one of the columns 130 stored in database 125. Each vector 210 provides an indication of the frequency of each of the terms of set of terms 205 in the corresponding column 140a, 130a, 130b, or 130c. In step 350, data mapper tool 105 determines a similarity measure 215 between first vector 210a, corresponding to import column 140a, and each of vectors 210b through 210d. Each similarity measure 215 provides a measure of the similarity between the entries of import column 140a and the entries of the corresponding column 130 stored in database 125.

In step 355, data mapper tool 105 identifies those columns 130, stored in database 125, associated with the largest similarity measures 215. For example, in certain embodiments, data mapper tool 105 may identify the column 130 associated with the largest similarity measure 215. In some embodiments, data mapper tool 105 may identify the n columns 130 associated with the largest similarity measures 215, where n is a predefined number greater than 1. In certain embodiments, data mapper tool 105 may store an indication of the columns 130, associated with the largest similarity measures 215, in a file. In some embodiments, data mapper tool 105 may present user 110 with the indication of the columns 130, associated with the largest similarity measures 215, in a message 180.

In certain embodiments, in addition to identifying the column 130 associated with the largest similarity measure 215, data mapper tool 105 may additionally import the entries of import column 140a into the column 130 associated with the largest similarity measure 215. For example, if the column 130 associated with the largest similarity measure 215 includes twenty entries, and import column 140a includes ten entries, data mapper tool 105 may store the ten entries of import column 140a as additional entries of column 130, such that column 130 includes thirty entries.

Modifications, additions, or omissions may be made to method 300 depicted in FIG. 3. Method 300 may include more, fewer, or other steps. For example, steps may be performed in parallel or in any suitable order. While discussed as data mapper tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a hardware processor configured to:
extract a column for import from an external source, the column for import comprising one or more entries, the column for import to be stored in a database configured to store a set of columns, the set of columns comprising a first column and a second column, the first column comprising one or more entries and the second column comprising one or more entries;
split the entries of the column for import into a set of terms;
generate a first vector, a second vector, and a third vector, based on the set of terms, wherein generating the first vector, the second vector, and the third vector comprises, for each term in the set of terms:
determining a first frequency of the term in the entries of the first column;
generating a component of the first vector, based on the first frequency;
determining a second frequency of the term in the entries of the second column;
generating a component of the second vector, based on the second frequency;
determining a third frequency of the term in the entries of the column for import; and
generating a component of the third vector, based on the third frequency;
determine a first similarity measure, based on the first vector and the third vector;
determine a second similarity measure, based on the second vector and the third vector;
determine that the first similarity measure is greater than the second similarity measure; and
in response to determining that the first similarity measure is greater than the second similarity measure, indicate that the first column is a mapping candidate for the column for import.

2. The apparatus of claim 1, wherein, for each term of the set of term:
generating the component of the first vector, based on the first frequency, comprises multiplying the first frequency by an inverse total frequency, the inverse total frequency calculated based on a division of a total number of entries of the first column, the second column, and column for import, and a number of entries of the first column, the second column, and the column for import comprising the term;
generating the component of the second vector, based on the second frequency, comprises multiplying the second frequency by the inverse total frequency; and
generating the component of the third vector, based on the third frequency, comprises multiplying the third frequency by the inverse total frequency.

3. The apparatus of claim 1, wherein the set of terms comprises the entries of the column for import.

4. The apparatus of claim 1, wherein:
an entry of the column for import comprises a first part and a second part; and
the set of terms comprises a first term corresponding to the first part of the entry of the column for import and a second term corresponding to the second part of the entry of the column for import.

5. The apparatus of claim 4, wherein:
splitting the entries of the column for import into the set of terms comprises:
determining a fraction of distinct entries of the column for import, wherein determining the fraction of distinct entries of the column for import comprises:
determining a number of distinct entries of the column for import;
determining a total number of entries of the column for import; and
dividing the number of distinct entries of the column for import by the total number of entries of the column for import;
determining that the fraction of distinct entries of the column for import is greater than a threshold; and
in response to determining that the fraction of distinct entries of the column for import is greater than the threshold, storing the first part of the entry of the column for import as a first term of the set of terms and storing the second part of the entry of the column for import as a second term of the set of terms.

6. The apparatus of claim 1, wherein the external source comprises at least one of a structured database, an unstructured database, and a text document.

7. The apparatus of claim 1, wherein indicating that the first column is the mapping candidate for the column for import comprises:
generating a document comprising the indication that the first column is the mapping candidate for the column for import; and
communicating the document.

8. A method comprising:
extracting a column for import from an external source, the column for import comprising one or more entries, the column for import to be stored in a database, the database configured to store a set of columns, the set of columns comprising a first column and a second column, the first column comprising one or more entries and the second column comprising one or more entries;
splitting the entries of the column for import into a set of terms;
generating a first vector, a second vector, and a third vector, based on the set of terms, wherein generating the first vector, the second vector, and the third vector comprises, for each term in the set of terms:
determining a first frequency of the term in the entries of the first column;
generating a component of the first vector, based on the first frequency;
determining a second frequency of the term in the entries of the second column;
generating a component of the second vector, based on the second frequency;
determining a third frequency of the term in the entries of the column for import; and
generating a component of the third vector, based on the third frequency;
determining a first similarity measure, based on the first vector and the third vector;
determining a second similarity measure, based on the second vector and the third vector;
determining that the first similarity measure is greater than the second similarity measure; and
in response to determining that the first similarity measure is greater than the second similarity measure, indicate that the first column is a mapping candidate for the column for import.

9. The method of claim 8, wherein, for each term of the set of term:
generating the component of the first vector, based on the first frequency, comprises multiplying the first frequency by an inverse total frequency, the inverse total frequency calculated based on a division of a total number of entries of the first column, the second column, and the third column, and a number of entries of the first column, the second column, and the column for import comprising the term;
generating the component of the second vector, based on the second frequency, comprises multiplying the second frequency by the inverse total frequency; and
generating the component of the third vector, based on the third frequency, comprises multiplying the third frequency by the inverse total frequency.

10. The method of claim 8, wherein the set of terms comprises the entries of the column for import.

11. The method of claim 8, wherein:
an entry of the column for import comprises a first part and a second part; and
the set of terms comprises a first term corresponding to the first part of the entry of the column for import and a second term corresponding to the second part of the entry of the column for import.

12. The method of claim 11, wherein:
splitting the entries of the column for import into the set of terms comprises:
determining a fraction of distinct entries of the column for import, wherein determining the fraction of distinct entries of the column for import comprises:
determining a number of distinct entries of the column for import;
determining a total number of entries of the column for import; and
dividing the number of distinct entries of the column for import by the total number of entries of the column for import;
determining that the fraction of distinct entries of the column for import is greater than a threshold; and
in response to determining that the fraction of distinct entries of the column for import is greater than the threshold, storing the first part of the entry of the column for import as a first term of the set of terms and storing the second part of the entry of the column for import as a second term of the set of terms.

13. The method of claim 8, wherein the external source comprises at least one of a structured database, an unstructured database, and a text document.

14. The method of claim 8, wherein indicating that the first column is the mapping candidate for the column for import comprises:
generating a document comprising the indication that the first column is the mapping candidate for the column for import; and
communicating the document.

15. A system comprising:
a storage element operable to store a set of columns, the set of columns comprising a first column and a second column, the first column comprising one or more entries and the second column comprising one or more entries; and
a processing element operable to:
extract a third column from an external source, the third column to be stored in the storage element, the third column comprising one or more entries, wherein the external source comprises at least one of a structured database, an unstructured database, and a text document;
split the entries of the third column into a set of terms;
generate a first vector, a second vector, and a third vector, based on the set of terms, wherein generating the first vector, the second vector, and the third vector comprises, for each term in the set of terms:
determining a first frequency of the term in the entries of the first column;
generating a component of the first vector, based on the first frequency;
determining a second frequency of the term in the entries of the second column;
generating a component of the second vector, based on the second frequency;
determining a third frequency of the term in the entries of the third column; and generating a component of the third vector, based on the third frequency;

determine a first similarity measure, based on the first vector and the third vector;

determine a second similarity measure, based on the second vector and the third vector;

determine that the first similarity measure is greater than the second similarity measure; and in response to determining that the first similarity measure is greater than the second similarity measure, indicate that the first column is a mapping candidate for the third column.

16. The system of claim 15, wherein, for each term of the set of term:

generating the component of the first vector, based on the first frequency, comprises multiplying the first frequency by an inverse total frequency, the inverse total frequency calculated based on a division of a total number of entries of the first column, the second column, and the third column, and a number of entries of the first column, the second column, and the third column comprising the term;

generating the component of the second vector, based on the second frequency, comprises multiplying the second frequency by the inverse total frequency; and generating the component of the third vector, based on the third frequency, comprises multiplying the third frequency by the inverse total frequency.

17. The system of claim 15, wherein the set of terms comprises the entries of the third column.

18. The system of claim 15, wherein:

an entry of the third column comprises a first part and a second part; and the set of terms comprises a first term corresponding to the first part of the entry of the third column and a second term corresponding to the second part of the entry of the third column.

19. The system of claim 18, wherein:

splitting the entries of the third column into the set of terms comprises:

determining a fraction of distinct entries of the third column, wherein determining the fraction of distinct entries of the third column comprises:

determining a number of distinct entries of the third column;

determining a total number of entries of the third column; and dividing the number of distinct entries of the third column by the total number of entries of the third column;

determining that the fraction of distinct entries of the third column is greater than a threshold; and in response to determining that the fraction of distinct entries of the third column is greater than the threshold, storing the first part of the entry of the third column as a first term of the set of terms and storing the second part of the entry of the third column as a second term of the set of terms.

20. The system of claim 15, wherein indicating that the first column is the mapping candidate for the third column comprises:

generating a document comprising the indication that the first column is the mapping candidate for the third column; and communicating the document.

* * * * *